Aug. 16, 1927.

H. FORD 1,639,334

CRANK AND PITMAN MECHANISM

Filed May 25, 1921

Inventor
Henry Ford,
By
Attorneys

Aug. 16, 1927.
H. FORD
1,639,334
CRANK AND PITMAN MECHANISM
Filed May 25, 1921      2 Sheets-Sheet 2
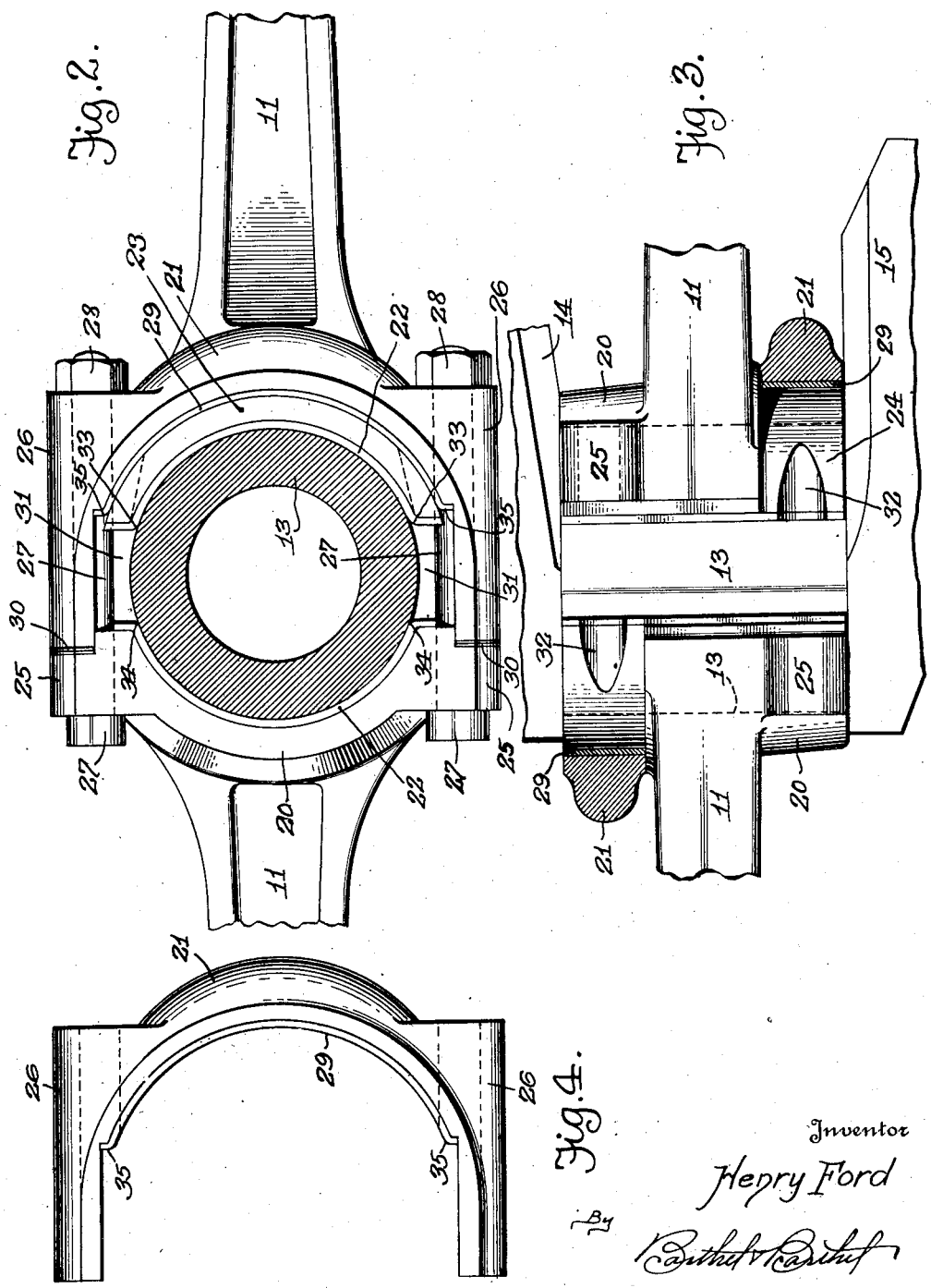
Inventor
Henry Ford
By
Attorneys Patented Aug. 16, 1927.

1,639,334

UNITED STATES PATENT OFFICE.

HENRY FORD, OF DEARBORN, MICHIGAN.

CRANK AND PITMAN MECHANISM.

Application filed May 25, 1921. Serial No. 472,589.

My invention relates to mechanisms embodying a plurality of pitmen co-operating with and radiating from a common crank, and more particularly relates to a composite pitman head for a single acting mechanism of this character.

In any single acting crank and pitman mechanism, the bearing pressures imposed on the crank pin by the pitman rod side and cap side of the pitman head, respectively, are unequal; and under ordinary working conditions where the pitman rod is stressed principally in compression, the principal bearing pressure is imposed on the pitman rod segment of the pitman head or crank pin bearing. A single acting engine having a plurality of cylinders arranged angularly about the axis of a crank shaft and each provided with a reciprocating piston adapted to communicate an impulse directed toward the crank shaft through an individual pitman to a common crank, and operating under ordinary speeds and pressures; provides an example of a crank and pitman mechanism imposing a principal bearing pressure on the pitman rod segment of the crank pin bearing and typifies a mechanism to which my present invention is particularly and advantageously applicable.

The general objects of my invention are to organize and construct a simple and efficient crank and pitman mechanism embodying a plurality of pitmen co-operating with a common crank, and in which the unit bearing pressure on the crank pin bearing is uniformly distributed and with a minimum difference between the maximum and minimum pressures present; in which the co-ordination and distribution of bearing surfaces with respect to the force vectors involved is brought closer to a faultless condition; in which adequate bearing wear compensation is provided; in which liability to cramping and pinching of the bearing is largely reduced if not eliminated; and in which the structure is of simple construction and non-cumbersome, readily handled and manipulated, and generally free from trouble in service and in installation.

Further objects of the invention are: to provide a composite pitman head for plural pitman common crank mechanisms wherein the bearing surfaces are advantageously co-ordinated and disposed; to provide a composite pitman head for a crank and pitman mechanism embodying a plurality of pitmen radiating from a common crank, wherein a maximum bearing surface area is available to those segments of the crank pin bearing to which the principal pressures are applied; and to provide a concentric plural pitman head having a composite common crank pin bearing that is free from liability to cramping and pinching, that is adjustable for wear, that may readily be lubricated, and the structure of which is simple, compact, durable and economical of production.

To these and other ends, my invention may consist in the mechanism of a single acting engine as shown in the drawings, wherein:

Fig. 2 is a transverse sectional elevation taken in the plane of the line II—II of Fig. 1 and looking in the direction of the arrows, showing in elevation the common composite pitman head and adjacent ends of a pair of pitmen and showing in section the crank pin common thereto and embraced thereby;

Fig. 3 is an elevation corresponding to Fig. 1 of the structure shown in Fig. 2, the caps, however, being broken away and their bolts removed; and Fig. 4 is an elevation corresponding to Fig. 2 of one of the caps alone.

Figure 1:
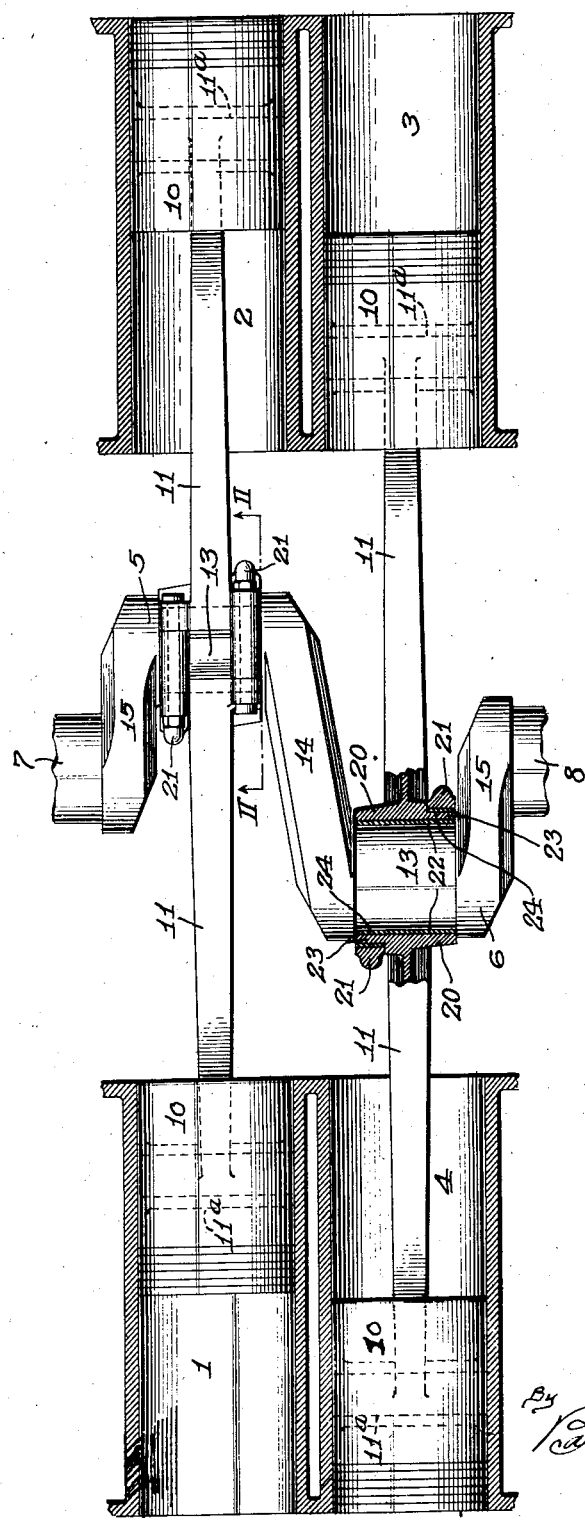
Figure 1 is a fragmentary sectional elevation of the displacement and turning effort mechanism of a single acting engine embodying my invention.

The present embodiment of my invention is shown in the drawings as applied to a crank and pitman mechanism constituting a simple combination of a plurality of pitmen with a common crank; and two sets of these mechanism are combined, as shown in Figure 1, in the mechanical system of a four cylinder double crank engine, this illustrating a form of what is generally known as an engine of the double-opposed type, and is presented to illustrate the characteristics of the present invention, which pertains more particularly to the displacement and turning effort systems present in internal combustion engines of the four-cycle type, where a plurality of pitmen are connected to a single crank of the crank-shaft.

The cylinders 1, 2, 3 and 4 are arranged in a common plane and in mutual parallelism about the 180 degree cranks 5 and 6 of a crank shaft journaled at 7 and 8, thus setting up the characteristics of a double-opposed motor structure, the type employed for illustrating the characteristics of the present invention. The cylinders 1 and 2 are preferably co-axial and disposed in the plane of rotation of the crank 5 with which their moving elements mutually co-operate. The cylinders 3 and 4 are similarly related to the crank 6 and to one another.

Each of the cylinders is provided with a reciprocable trunk piston 10 that is individually connected to its respective crank through a pitman 11 and each of these pitmen is pivotally attached to its piston about the axis of a wrist pin 11$^a$ and journaled at its head end about the axis of a crank pin 13 extending between the arms 14 and 15 of the cranks 5 or 6.

It will be observed that the cylinders are arranged in groups about each crank circle with outwardly divergent coplaner axes and that the pitmen of each group of cylinders radiate from a common crank pin with which they mutually cooperate but about which they are individually journaled. According to my invention a composite pitman head is provided for each group of pitmen and their crank pin; and since in the present embodiment of my invention the groups above referred to constitute pairs, such as the alined cylinders 1 and 2, and their pitmen; a double composite pitman head for the pitmen of a pair of cylinders co-operating with a common crank and having an included angle between their axes and about the crank circle of approximately 180 degrees, is illustrated and described in detail.

In this pitman head a full length crank pin bearing for each pitman is formed within the pitman head body of each pitman whereas the cap bearings for the pitmen are formed externally of their bodies and concentric with their crank pin bearings. Furthermore, for avoiding liability to cramping, each pitman has elements of its crank pin constrainment surfaces disposed on opposite sides of a plane passing through the crank pin axis normal to the pitman length.

To this end I attach, rigidly, to the crank pin end of each pitman rod 11 a body 20 that is generally arcuate in form, that is, a segment of an annulus of suitable radial thickness, having an axial length co-extensive with the length of the crank pin and having an angular length approximating the arcuate length of its crank pin bearing surface, hereinafter more fully set forth. The capping means, whereby the head formation produced by the assembly of the pitman segments, is held assembled and the bodies seated on the crank pin, is distributed on both sides of a plane normal to the pitman length and passing through the crank pin axis; and includes a plurality of circumposed cap sections, such as 21, one or more rigid with and one or more movable with respect to each pitman body.

The concave crank pin bearing surface of each body may be faced and lined with a bearing metal bushing 22 and the convex back of the annularly segmental axially extending end 23 of these bodies may be utilized to carry the arcuate cap bearing surfaces 24 that are formed co-axial with and in opposed relation to the crank pin bearing surfaces.

The caps 21 should be equal in number to the pitmen employed and, especially when the arcuate length of the bearing surfaces are relatively short, one cap section should be rigid with each of the pitman bodies and should substantially circumpose the crank pin axis. Thus, although for three or more pitmen it may be desirable to form a surface 24 on each side of the pitman rod and to provide a plurality of split annular cap sections angularly surrounding these surfaces and divided axially thereof, an individual cap section of each pitman being angularly rigid therewith; yet, when but two pitmen co-operate with a single crank pin, a single surface 24 on each alternate side only of each of the two pitman rods may be used, and a pair of segmental caps 21 provided, each being adapted to co-operate with one surface 24 alone and to be secured directly to a correspondingly formed portion of its pitman body. The cap may, in this instance, be considered to be in part virtually integral with the pitman body, and thus it is clear that the constrainment afforded by the capping means may in either case be symmetrical with respect to the pitman rod and proportional to the sum of the axial lengths of a pair of surfaces 24, one on either side of the pitman plane.

In other words, that portion of each pitman formation that is active in producing the head assembly has a total arcuate length of bearing surface greater than the similar length of the bearing surface of the body 20 on the crank-pin, with the total arcuate length produced by separated bearing surfaces located respectively on opposite sides of a plane normal to the pitman length and extending through the crank pin axis, such plane, in the form of the invention illustrated, extending through the clearance spaces 31 presently referred to.

Accordingly, in the structure illustrating my invention in its present embodiment, each of the pitman bodies 20 on its end opposite to that on which its surface 24 is formed, is provided at each of its angular extremities with one of a pair of transversely extending ears 25 formed integral with the body; and each of the caps 21, as shown in Fig. 4, is similarly provided with a pair of corresponding ears 26 matching with and seating on the ears of the body. A screw threaded bolt 27 provided with a nut 28 passes through each of the matching pairs of ears 25 and 26 and holds the cap securely in place on its body. The bearing surfaces of the cap and body, viz, the concave surface of the crank pin bearing or its liner 22 and that of the cap, or its bearing metal liner 29 are thus seated on and held in contact with their corresponding sliding surfaces, that is the peripheral surface of the crank pin 13 and the surface 24 respectively. A set of shims 30 may be interposed between the abutting surfaces of the corresponding cap and body ears to facilitate the setting and adjustment of the caps with respect to their bodies and thus also bearing surfaces circumposed about the crank pin axis.

A clearance space 31 extending angularly about the periphery of the crank pin is provided between the adjacent angular ends of the crank pin bearing segments of the successive pitman bodies. This accomodates the differential pivotal movement of the adjacent bodies about the crank pin axis and therefore its angular extent is dictated by the maximum relative deflection of adjacent pitmen and preferably increased by a suitable addendum.

A similar clearance is provided for portions of adjacent relatively movable parts that are liable to interfere. Thus when the bolts 27 are placed relatively close to the crank pin surface, their shanks may interfere with the relatively movable body and accordingly the grooves 32 are provided, these grooves being disposed and formed to receive and clear the adjacent bolt shanks when the deflection between the corresponding pitman is a maximum.

The angular value "S" of the clearance 31 and all similar clearances may be represented by the formula:

$$S = \frac{2}{L}\sin\frac{X}{2} + C$$

Where: S denotes the angular value of the clearance in radian measure;
L is the pitman length in terms of the crank circle radius;
X is the angle in radians, included between the respectively adjacent cylinder axes;
C denotes an addendum added to insure the separation of the opposed relatively movable surfaces, (such as 33—34) when at their limit of approach. A practical minimum value for this quantity may be .005 of the crank pin diameter.

Where the pitmen of two co-axial slides or pistons are adapted according to my invention to co-operate with a common crank pin, the arcuate length "B" of each crank pin bearing segment, that is the angular length of the surface between its extremities 33—33 or 34—34, is preferably extended through its maximum effective angle, e. g., the surface may be made co-extensive with the projected area of the crank pin. In this case the angular extent of the crank pin surface not embraced by the bearing segments will, if equally divided, be more than adequate to provide the clearance space 31 since each interval will be greater than the necessary value of "S." In general, the length "B" of the various pitman segments is the result of apportioning the difference between 2 pi radians and the sum of the spaces "S" to the various pitmen; and thus the arcuate length "B" of the body segment 20 of each of a plurality of pitmen 11, having their respective axes of reciprocation uniformly spaced about the crank circle may be represented generally by the formula:

$$B = \frac{2\pi}{N} - S$$

where: B is in radian measure and
N is the number of pitmen.

The angular length of the bearing surface 29 of the cap 21, i. e., the angular distance between its terminal surfaces 35—35 is preferably, substantially co-extensive with the extent and disposition of the surfaces 24 that are to be embraced thereby.

Having thus fully described my invention, what I claim is:—

1. In a crank and pitman mcehanism, the combination with a crank pin and a plurality of radiating pitmen, of a composite pitman head common to the crank pin and the pitmen, said head embodying a plurality of angularly spaced crank pin bearing segments seating on the crank pin and each individually attached to one of the pitmen, and capping means co-operating with the bearing segments for completing the pitman head formation and its constrainment, said formation including peripheral and circumposed elements presenting correspondingly co-operating bearing surfaces for each pitman distributed on both sides of a plane normal to the pitman length and passing through the crank pin axis, a segment of a circumposing element being carried by one pitman and superposed with respect to a segment of another pitman with the bearing surfaces of the element segment and the bearing segment extending on arcs differing in the length of the arc radius.

2. In a crank and pitman mechanism, the combination with a crank pin and a plurality of radiating pitman rods, of an arcuate crank pin bearing segment rigid with each of the rods and extending transversely in both directions therefrom and having a concave crank pin bearing surface the axial length of which is co-extensive with that of the crank pin, a plurality of convex cap bearing surfaces formed exteriorly of the extending ends of the segments and co-axial with their crank pin bearing surfaces, and a plurality of caps adapted to circumpose and slidingly engage their respective bearing surfaces, one of said caps being rigidly attached to each of said segments.

3. In a crank and pitman mechanism, the combination with a crank pin and a pair of radiating pitman rods, of a composite pitman head common to the crank pin and the pitman rods, said head comprising a pair of segmental bodies adapted to be alternately disposed in spaced relation about the crank pin and each individual to and rigid with one of said rods, each of said bodies extending transversely of its rod in both directions and axially of the crank pin, a concave segmental crank pin bearing formed in each of said bodies, a convex cap bearing surface formed exteriorly on a mutually alternate extending end of each of the bodies concentric with their crank pin bearing surface, and a pair of caps each adapted to engage with one of said cap bearing surfaces and to be secured to the adjacent portion of the opposed body.

In testimony whereof I affix my signature.

HENRY FORD.